(No Model.)  2 Sheets—Sheet 1.

L. SCHUTTE & J. B. LADD.
PNEUMATIC CONVEYER.

No. 469,175. Patented Feb. 16, 1892.

WITNESSES.

INVENTORS.
Louis Schutte
J. B. Ladd
By Phil. T. Dodge Atty (No Model.) 2 Sheets—Sheet 2.
L. SCHUTTE & J. B. LADD.
PNEUMATIC CONVEYER.
No. 469,175. Patented Feb. 16, 1892.
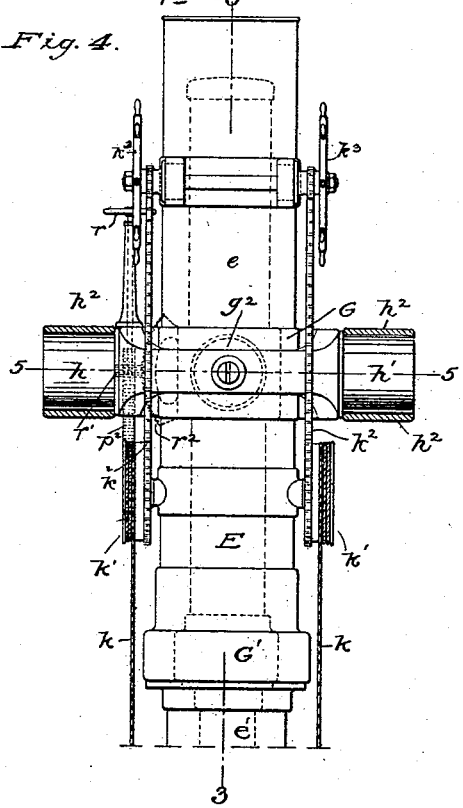
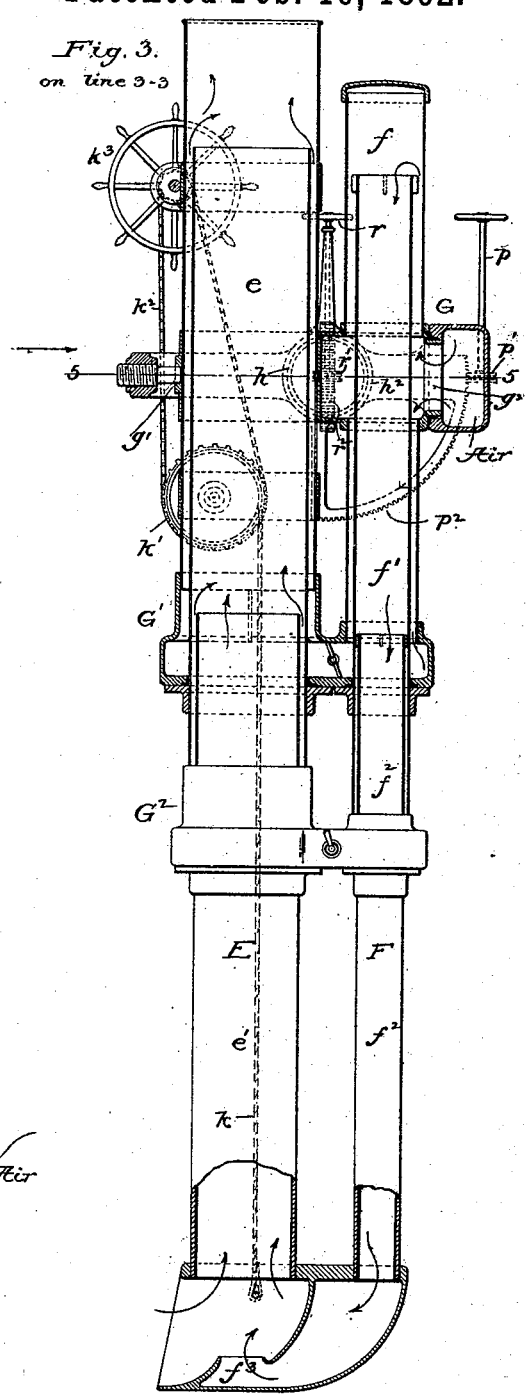
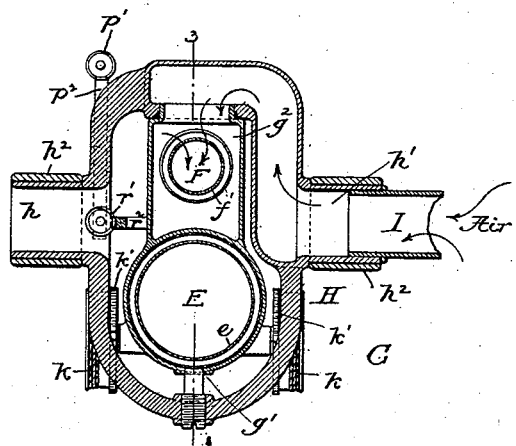
WITNESSES.
INVENTORS.
Louis Schutte
J. B. Ladd
By Phil T. Dodge
Atty

UNITED STATES PATENT OFFICE.

LOUIS SCHUTTE, OF PHILADELPHIA, PENNSYLVANIA, AND JAMES BEACH LADD, OF BALTIMORE, MARYLAND; SAID LADD ASSIGNOR TO SAID SCHUTTE.

PNEUMATIC CONVEYER.

SPECIFICATION forming part of Letters Patent No. 469,175, dated February 16, 1892.

Application filed May 28, 1891. Serial No. 394,362. (No model.)

*To all whom it may concern:*

Be it known that we, LOUIS SCHUTTE, of Philadelphia, county of Philadelphia, and State of Pennsylvania, and JAMES BEACH LADD, of Baltimore, in the State of Maryland, have invented a new and useful Improvement in Pneumatic Conveyers, of which the following is a specification.

Our invention relates to improved means for lifting and conveying coal, ore, and similar material by means of an air-blast.

The principal objects of the invention are to provide for the efficient application of air and for the convenient and universal adjustment of the apparatus in order to deliver the material from any required point to any other point desired within reasonable limits.

The apparatus may be variously modified in its form and details to suit the conditions under which it is to be used in each case; but for purposes of illustration we have represented the same as adapted more particularly for use on a dock for removing the material from ships and delivering the same into cars on an adjacent railway.

Figure 1:
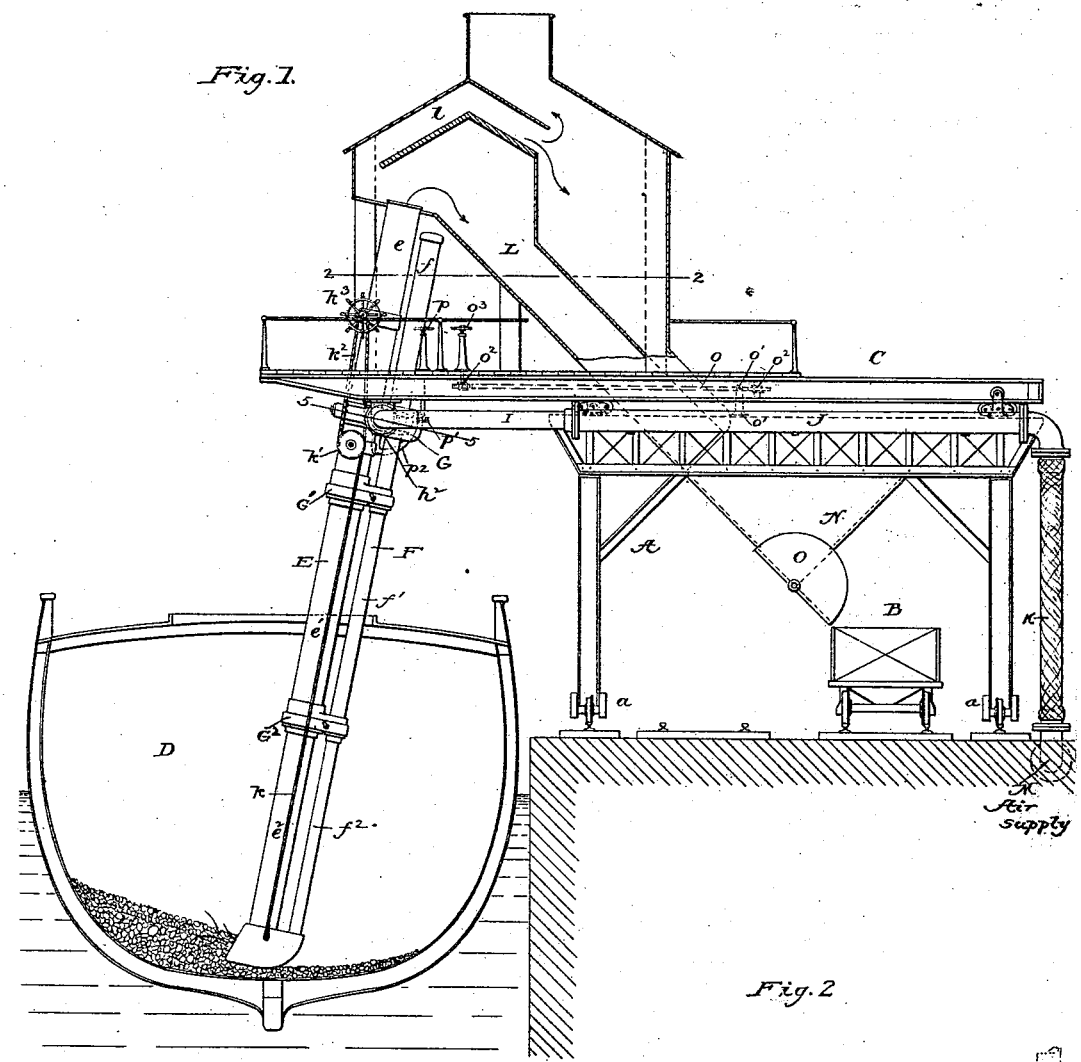
Figure 2:
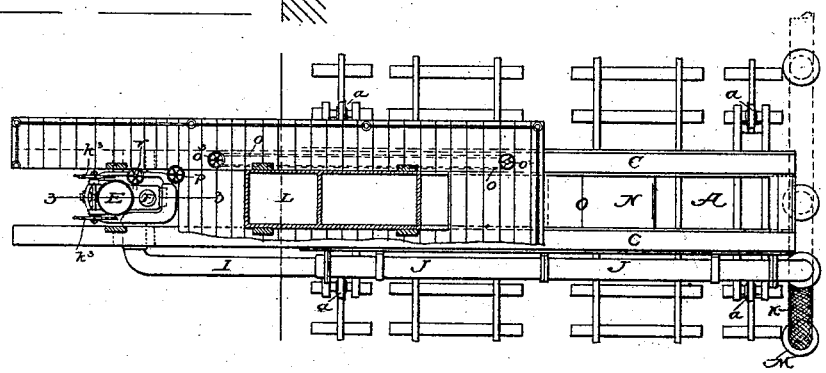

In the accompanying drawings, Figure 1 is a side elevation, partly in section, of our improved apparatus. Fig. 2 is a top plan view, the parts above the line 2 2, Fig. 1, being broken away. Fig. 3 is a vertical central cross-section on the line 3 3 of Figs. 2, 4, and 5. Fig. 4 is a front elevation of the upper part of the discharge-tube and attendant parts, looking in the direction indicated by the arrows in Figs. 3 and 5. Fig. 5 is a cross-section on the line 5 5 of Figs. 1, 3, and 4.

Referring to the drawings, A represents a gallows-frame provided with supporting-wheels $a$ and arranged to travel on rails upon the dock parallel with its front and over the track on which the receiving-cars B are mounted.

On the frame A there is mounted a top frame C, sustained by suitable rollers and arranged to slide forward and backward, so that its end may be projected beyond the dock to overhang the ship D, from which the material is to be delivered. At its outer end this frame gives support to the discharge-tube E and to the air-supply pipe F, attached to its side, the two devices being connected to the frame, as hereinafter detailed, by a universal joint, so that they may be swung freely in all directions. The discharge-tube E consists of any suitable number of sections $e$ $e'$, &c., arranged to slide one within another with a telescopic action, in order that the tube may be lengthened and shortened, as the required position of its lower receiving end may demand. The air-supply pipe F is constructed in like manner with a series of telescoping sections $f$ $f'$, &c., and at the lower end the air-pipe delivers in an upward direction through an outlet $f^3$ into the lower end of the discharge-tube E, the jet of air thus delivered into the tube acting with an inductive effect to carry the coal or other material upward into the mouth of the tube, through which its course is continued in an upward direction by the direct propelling effect of the air.

In order that the material may be lifted in a continuous and uniform manner and in large volume to a considerable height, it is found advisable to use, in addition to the air-jet at the base, supplemental jets introduced into the discharge-pipe at different points in its length in an upward direction. For the purpose of introducing these jets we make the sections of the discharge-tube of such diameters as to leave annular spaces between them and construct the sections of the air-pipe F in like manner, and connect the two pipes by surrounding hollow couplings G G', &c.—such as shown in detail in Fig. 3—so that the air may pass from the upper end of the air-pipe through the annular spaces between its sections, and thence through the couplings into the annular spaces between the sections of the discharge-pipe, being finally delivered into the interior of the air-pipe at different points in its length in the form of annular upwardly-moving jets, which act successively on the ascending column of material, which is kept in suspension by the air. The essence of our invention in this regard lies in the employment of a telescopic discharge-pipe and in providing a discharge-pipe, telescopic or other form, with a series of air-inlets at different heights, so that the ascending material may be repeatedly subjected not only to the initial volume or current of air, but also to repeated impulses from additional jets. By this application of jets successively to effect the elevation of the moving material we are enabled to insure the continuity of the flow and to effect the elevation to a great height, thus overcoming the uncertainty and the danger of stoppage which attends the ordinary application of the air.

Passing now to the details of the parts which support the tubes, attention is directed particularly to Figs. 2, 3, 4, and 5, in which it will be seen that the coupling G, supporting the upper ends of the two tubes, is sustained at one end by a horizontal journal $g'$ and at the opposite end by a hollow trunnion $g^2$ in a surrounding yoke or frame H, which is in turn provided with and supported by hollow horizontal trunnions $h$ and $h'$ in bearings $h^2$, bolted to the top frame C. The journal $g'$, as shown in Fig. 5, projects inward from the frame H, to which it is rigidly attached, and has its inner end seated loosely in a depression in the coupling G'. The journals of the couplings and the yoke stand at right angles to each other, forming a universal joint, so that the lower ends of the tubes may be swung horizontally in any required direction. The hollow journal $g^2$ of the top coupling, through which air is introduced to the pipe, communicates in its turn through a passage in the rocking yoke with the hollow trunnion $h'$ of the latter, this trunnion being in its turn connected to the end of the air-supply pipe I, extending in the direction of the length of the frame C and arranged to slide into and out of a pipe J, carried by frame C, and connected in its turn by a flexible or other pipe K with a stationary main M, which is constantly supplied with air from a pump or other source of fluid-pressure. This main may be provided with a series of necks to permit the attachment of the pipe at different points. Under the above arrangement the air passes from the main M through the intermediate connections into the upper end of the pipe F, the various telescopic and swiveling connections permitting the frame C to slide inward and outward and the tubes to be lengthened and shortened and swung freely in all directions without interrupting the continuity of the connections or in any manner interfering with the flow of the air. In short, the arrangements permit the entire structure to be moved along the dock from place to place, as may be demanded, and of the receiving end of the discharge-tube being introduced in any required position into the vessel and to be changed in position as the discharge of the load may require.

The raising and lowering of the lower ends of the tube may be effected by any appropriate mechanism; but we commonly employ a rope or chain $k$, extending from the lower end of the tube upward to a winding-drum $k'$, which is driven through sprocket-wheels thereon by chains $k^2$ from pulleys on the hand-wheels $k^3$, mounted above the frame or platform C, so that it may be conveniently operated by the attendant. The upper end of the tube E delivers into the upper part of an inclined chute L, through which the material is delivered by gravity into a hopper N on the end of the gallows-frame, this hopper having at its bottom a reversible pivoted shoe O, through which the material may be delivered to the right or left into the receiving-cars. The chute L is inclosed at its upper end to prevent the escape of dust, but provided with an irregular outlet $l$, through which the air may escape.

The various adjustments of the parts may be effected by any suitable appliances, but we commonly employ the following: To shift the platform C inward and outward an endless chain $o$ is attached to a supporting-post $o'$ on the main frame and carried around two guide-pulleys $o^2$, both of which are mounted on the sliding frame and one of which is connected to the vertical shaft of a hand-wheel $o^3$, the rotation of which will have the effect of carrying the frame C forward or backward, as demanded. The swinging motion of the tubes to and from the dock is effected by a hand-wheel $p$ on the upper end of a shaft, carrying at its lower end a worm $p'$, engaging a segment-rack $p^2$, fixed to the yoke. The swinging motion in the other direction is effected by a hand-wheel $r$ on a vertical shaft, provided at the lower end with a worm-wheel $r'$, engaging a segment-rack $r^2$, fixed to the coupling G.

Having thus described our invention, what we claim is—

1. In a pneumatic conveyer, a discharge-tube open at both ends, in combination with supports therefor jointed to permit a universal swinging motion of the receiving end of the tube, means for adjusting the tube endwise in relation to the supports, an air-supply pipe connected to the discharge-tube and delivering into its lower end, and a hopper or receptacle into which the tube discharges.

2. In a pneumatic conveyer, a telescopic discharge-tube and a telescopic air-pipe delivering thereto, in combination with jointed supports permitting a universal swinging motion of the tubes.

3. In a pneumatic conveyer, a telescopic discharge-tube, in combination with a telescopic air-tube and connections through which the air-tube discharges into the other at different points in its length.

4. In a pneumatic conveyer, a discharge-tube having an uninterrupted passage therethrough from the receiving to the delivery points, in combination with means for delivering air under pressure into the tube at its receiving end and also between its ends, whereby the material being moved is subjected to repeated propelling impulses and kept continuously in motion.

5. The telescopic discharge-tube and the telescopic air-tube, each having annular spaces between the adjacent ends of the adjoining sections, in combination with the hollow couplings through which the air is delivered from one tube to the other.

6. In combination with the discharge-tube and air-tube, their supporting collar or coupling mounted on journals, the yoke in which said journals are seated sustained in its turn by journals, and the air-supply pipe communicating through the journals with the air-tube, whereby the tubes are permitted a universal motion without affecting the delivery of the air thereto.

7. The supporting-frame A and sliding frame C, in combination with the air-supply pipe thereon, the pipe sliding therein, the air and discharge tubes, and the universally-jointed support connecting the tubes to the frame C and provided with an air-passage through which the sliding pipe communicates with the air-tube.

In testimony whereof I hereunto set my hand, this 16th day of April, 1891, in the presence of two attesting witnesses.

LOUIS SCHUTTE.

Witnesses:
DANIEL W. HILDRETH,
MAURICE F. SPILLIN.

In testimony whereof I hereunto set my hand this 5th day of May, 1891, in the presence of two attesting witnesses.

JAMES BEACH LADD.

Witnesses:
ROBT. M. HOOPER,
WILLIAM D. HUNTER.